United States Patent [19]

Hess

[11] Patent Number: 5,218,354
[45] Date of Patent: Jun. 8, 1993

[54] COMMUNICATION SYSTEM WITH IMPROVED RESOURCE ASSIGNMENT

[75] Inventor: David W. Hess, Rolling Meadows, Ill.

[73] Assignee: Motorola, Inc., Schaumburg, Ill.

[21] Appl. No.: 676,598

[22] Filed: Mar. 28, 1991

Related U.S. Application Data

[63] Continuation of Ser. No. 370,497, Jun. 23, 1989, Pat. No. 5,025,254.

[51] Int. Cl.$^5$ ............................................. H04B 7/00
[52] U.S. Cl. ................................... 340/826; 455/34.1; 455/54.1
[58] Field of Search ............... 340/825.44, 825.47, 340/826; 455/34.1, 34.2, 11.1, 54.1, 53.1, 54.2, 62, 63; 379/62, 63, 58

[56] References Cited

U.S. PATENT DOCUMENTS

| | | | |
|---|---|---|---|
| 3,913,017 | 10/1975 | Imaseki | 455/54 |
| 4,525,861 | 6/1985 | Freeburg | 455/33.4 |
| 4,646,345 | 2/1987 | Zdunek et al. | 379/58 |
| 4,996,685 | 2/1991 | Farese et al. | 370/58.1 |
| 5,025,254 | 6/1991 | Hess | 340/82 G |
| 5,038,342 | 8/1991 | Crisler et al. | 370/50 |

Primary Examiner—Donald J. Yusko
Assistant Examiner—Dervis Magistre
Attorney, Agent, or Firm—James A. Coffing; Steven G. Parmelee

[57] ABSTRACT

A trunked communication system wherein some of the communication resources are preassigned for exclusive use only by a predetermined group, such as a public safety agency. In addition, to assure optimal assignment of communication resources, communication resource assignments are made pursuant to a methodology that minimizes usurpation of unused resource capabilities.

10 Claims, 2 Drawing Sheets

COMMUNICATION SYSTEM WITH IMPROVED RESOURCE ASSIGNMENT

This application is a divisional of U.S. Ser. No. 07/370,497 filed Jun. 23, 1989, and issued as U.S. Pat. No. 5,025,254.

TECHNICAL FIELD

This invention relates generally to radio frequency (RF) communication systems, and particularly to trunked RF communication systems.

BACKGROUND ART

Trunked RF communication systems are known in the art. In general, such systems typically include a plurality of communication resources (such as single or paired frequencies, which frequencies may or may not support TDM time slots) that are supported by a like number of repeaters. The allocation of these resources amongst various communication units (such as portable units, mobile units, and fixed location units) is directed by a resource controller (which may be centrally situated, or distributed, such as, for example, within the repeater structure itself).

Some systems support a plurality of communication capabilities. For example, while some or all of the communication resources will typically support dispatch service, at least some of the resources may also support telephone interconnect services, secure (encrypted) services, paging services, data services, and other extended capability services. Generally, when initiating a communication, a communication unit will provide some sort of indication, such as an op-code, to the resource controller to indicate the type of service requested. The resource controller then functions, at least in part, to ensure that the communication unit has access to a resource having the necessary capability or capabilities.

Prior art systems do not necessarily allocate such multi-capability resources in an efficient manner. For example, a communication resource that will support both secure and interconnect services may be assigned to a communication unit that only requires interconnect service, notwithstanding the possible availability of another resource that might supports telephone interconnect service but not secure communications. By allowing the above allocation, the resource controller causes usurpation of the secure capability, since that capability is no longer available to other users for the duration of that particular communication.

Another problem exists in that prior art trunked systems tend to maintain all communication resources as available to all communication units, provided only that a requesting communication unit be capable of exercising one or more of the communication capabilities of a candidate resource. Therefore, some communication users, such as public safety agencies, are often required to own, maintain, and operate a privately owned trunked radio system in order to ensure that communication facilities are available when needed. Such agencies are precluded from considering the option of purchasing air time from a third party provider of communication resources, such as a SMR (specialized mobile radio) service.

SUMMARY OF THE INVENTION

These needs and others are substantially met through provision of the communication system having an improved communication resource assignment capability. In one embodiment of this invention, some, but not all, of the communication resources are reserved for use only by a preselected group. The preselected group may be, for example, a police department. Pursuant to this configuration, member units of the preselected group have exclusive access to the dedicated communication resources, and, if desired, may also be provided with optional access to the remaining communication resources of the system. Units that do not belong to the preselected group have access only to the non-dedicated resources.

In this manner, ordinary users of SMR services are provided with trunked radio communication services as usual. Users with special needs, however, such as police departments, operate with exclusive resources, and, if desired, optional additional non-exclusive resources. Both exclusive and non-exclusive resources are allocated by a single resource controller, thereby allowing a SMR service provider the opportunity to service both public and private users, while simultaneously allowing certain user groups the opportunity of purchasing services as versus equipment.

In another embodiment of the invention, the communication resources support a plurality of communication capabilities. For example, various of the communication resources are capable of supporting various combinations of communication services, such as, for example, dispatch, interconnect, secure, data, and so forth. When determining a proper resource allocation in support of a particular requested call, the resource controller determines which of the communications resources have sufficient capabilities to support the needed communication, thereby forming a group of candidate communication resources. Thereafter, the resource controller selects whichever of the candidate communication resources will result in a minimized usurpation of unused communication capabilities. This prevents valuable communication capabilities from being displaced needlessly.

DETAILED DESCRIPTION OF THE PREFERRED EMBODIMENT

Figure 1:
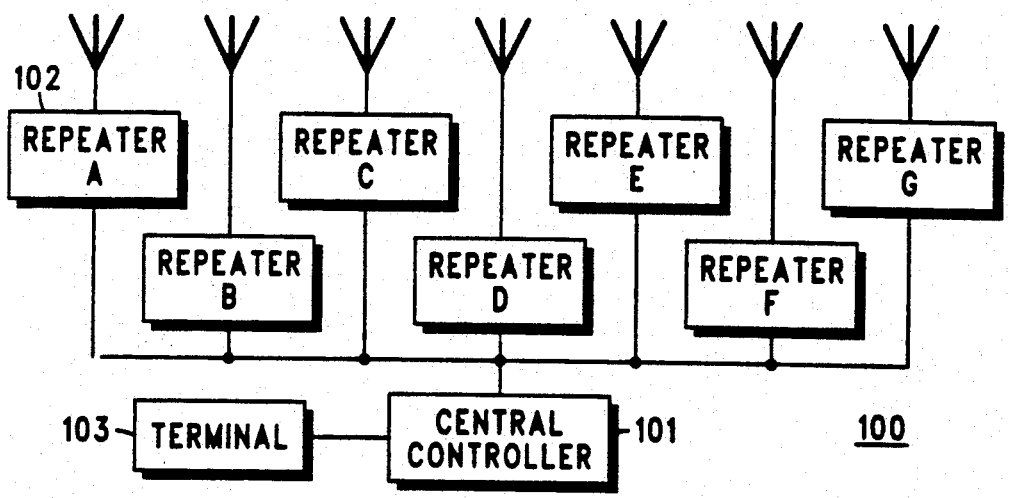
FIG. 1 comprises a block diagram depiction of a communication system configured in accordance with the invention.

A system constructed in accordance with the invention can be seen in FIG. 1 as depicted generally by reference numeral 100. A trunked communication system having a resource controller, such as a central controller (101), operably connects to 7 repeaters (102) (A–G) that support communications on the communication resources. In this particular embodiment, it will be presumed that one of the repeaters (G) comprises a dedicated control channel that supports inbound and outbound data signalling related to resource allocation and other system operability messages. The remaining 6 repeaters (A–F) support various communication capabilities as described in more detail below.

In addition, in this embodiment, the central controller (101) connects to a terminal (103) that allows a system operator to alter operating parameters that govern control of the system.

Various prior art trunking systems are known that would provide a satisfactory hardware and software embodiment for this invention. For example, a Privacy Plus trunked communication system, available from Motorola, Inc., can be readily configured as described above. The central controller (101) of such a system includes an appropriate computer platform to support the following described processing.

Prior to discussing the operation of the invention, it will be helpful to first detail, in hypothetical manner, the capabilities of the described system, giving particular reference to Table 1.

TABLE 1

| Resource | Capabilities | Group(s) |
| --- | --- | --- |
| A | D | SMR/Police |
| B | D, I | SMR/Police |
| C | D, S | SMR/Police |
| D | D, S, I | Police |
| E | D, S, I | Police |
| F | D, Data | SMR/Police |

D = Dispatch (Weight = 1)
I = Telephone interconnect (Weight = 2)
S = Secure (Weight = 3)
Data = Data messaging (Weight = 4)

In the table above, the 6 available communication resources are shown as having varying communication capabilities. For example, resource A will support dispatch communications, only, whereas resource D will support dispatch, secure, and telephone interconnect services. In addition, two of the resources (D and E) are reserved for exclusive use only by a predetermined group (police), whereas the remaining resources are available for use by either the predetermined group or the remaining system users (SMR) (to achieve this, existing resources and their associated repeaters may be assigned to the predetermined group, and/or new resources may be added to the system, which new resources are reserved for the exclusive use of the predetermined group). Finally, the various capabilities are weighted. In particular, dispatch services are provided with a weight factor of 1, telephone interconnect services are provided with a weight factor of 2, secure services are provided with a weight factor of 3, and data services are provided with a weight factor of 4. In general, the higher the weighting factor, the greater the preceived importance of that particular resource in that system. This weighting factor can represent either the intrinsic value of the service itself, and/or the relative scarcity of that resource, either as viewed from the standpoint of the system in its entirety, or with respect to accessibility to a particular group or groups.

Figure 2:
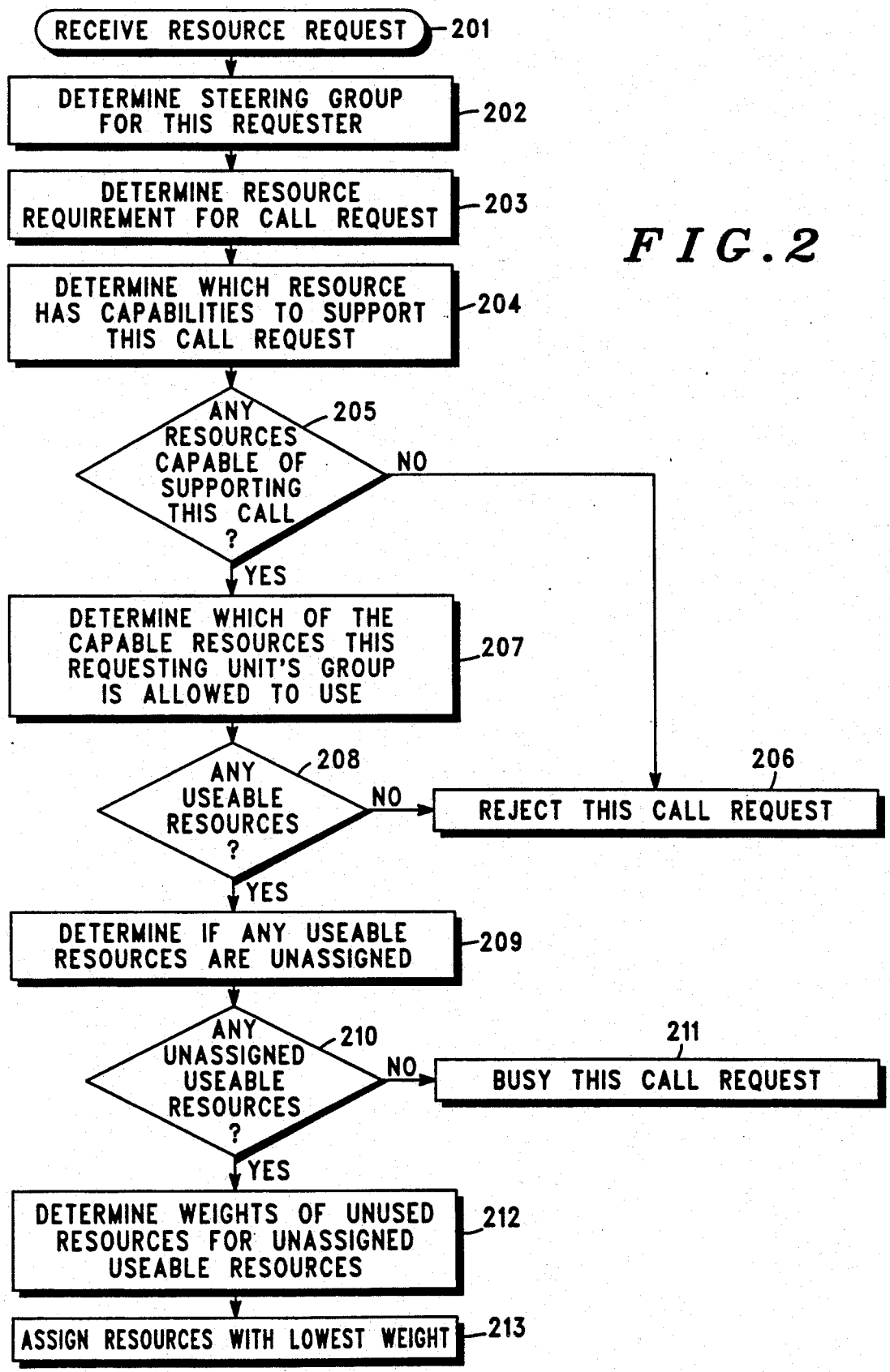
FIG. 2 comprises a flow diagram depicting operation of the resource controller in accordance with the invention.

Operation of the resource controller in accordance with the invention will now be described with reference to FIG. 2 and continued reference to Table 1.

In this particular embodiment, the processing begins when the resource controller receives a channel request (201) from a communication unit (this request will occur, of course, on the dedicated control channel referred to earlier, as well understood in the art). The resource controller then determines the relevant group for the requesting communication unit (202), which in this case will be presumed to be the police group. The resource controller then determines the resource capabilities that will be required to support this particular call request (203). For purposes of this example, it will be presumed that the requesting communication unit seeks to make a secure communication, and hence will need a communication resource that will support secure transmission activity.

The resource controller then determines which resources have capabilities suitable to support the call request (204 and 205). If no such resources exist, the call request will be denied (206). Presuming that there are some resources capable of supporting the call request, the resource controller then determines which of the capable resources are available for use by the group to which the communication unit belongs (207 and 208). Again, if there are no resources available to this particular group, the request will be denied (206). In this particular example, however, the communication unit belongs to the police group, and resources C, D, and E are all capable of supporting secure communications, and are all available to the police group.

The resource controller then determines whether any of these candidate resources are currently unassigned (209 and 210). If no resources are currently available, a busy signal is provided to the requesting unit (211). Otherwise, presuming for purposes of this example that all three resources are available, the resource controller will determine the weight factors of the unused resources (212). For example, resource C, being capable of supporting dispatch and secure communications, has a weight of 4 (1+3). This may be compared against the weight factor of resources D and E, which are both capable of supporting dispatch, secure, and telephone interconnect services, and therefore each have a weight of 6. The resource controller then allocates the resource having the lowest weight; in this example, resource C would be allocated to the requesting unit to support the desired communication.

So configured, the remaining two eligible resources (D and E) are not allocated, and hence their interconnect capabilities are preserved for subsequent assignment as needed.

From the above example, it should also be clear that the police group comprises a preselected group that is ensured exclusive access to two of the communication resources. Notwithstanding this exclusive access, the police group shares channel allocation control with other non-police users.

What is claimed is:

1. In a communication system having a resource controller for controlling allocation of a plurality of communication resources amongst a plurality of communication units, wherein at least one of the communication resources supports more than one communication capability, a method of assigning a communication resource to a communication unit, comprising the steps of:
   A) receiving a communication from a communication unit, which communication includes an indication of communication resource capability needs;
   B) determining which of the communication resources has sufficient capabilities to support the indicated communication resource capability needs, to thereby form a group of candidate communication resources;
   C) selecting whichever of the candidate communication resources will result in minimized usurpation of unused communication capabilities.

2. The method of claim 1, wherein the at least one communication resource supports at least both dispatch communication service and telephone interconnect service.

3. In a communication system having a resource controller for controlling allocation of a plurality of radio frequency communication resources amongst a plurality of radio frequency communication units, wherein a plurality of the radio frequency communication resources each support more than one communication capability, a method of assigning a communication resource to a communication unit, comprising the steps of:
  A) receiving a communication from a radio frequency communication unit, which communication includes an indication of radio frequency communication resource capability needs;
  B) when no radio frequency communication resources are currently available to support the indicated radio frequency communication resource capability needs, declining to provide the radio frequency communication unit with a radio frequency communication resource;
  C) when at least one radio frequency communication resource is currently available to support the indicated radio frequency communication resource capability needs, determining which of the radio frequency communication resources has sufficient capabilities to support the indicated radio frequency communication resource capability needs, to thereby form a group of candidate radio frequency communication resources;
  D) selecting whichever of the candidate radio frequency communication resources will result in minimized usurpation of unused communication capabilities.

4. The method of claim 3, wherein the step of selecting whichever of the candidate radio frequency communication resources will result in minimized usurpation of unused communication capabilites includes the steps of:
  D1) providing each of the candidate radio frequency communication resources with a weight factor related, at least in part, to particular communication capabilities supported by each of the candidate radio frequency communication resources; and
  D2) selecting a particular candidate radio frequency communication resource as a function of the weight factors.

5. The method of claim 4, wherein the step of providing each of the candidate radio frequency communication resources with a weight factor related, at least in part, to particular communication capabilities supported by each of the candidate radio frequency communication resources includes the steps of:
  D1a) assigning each communication capability an associated predetermined weight value;
  D1b) for each candidate radio frequency communication resource, combining the weight values that represent each of the communication capabilites supported by each candidate radio frequency communication resource.

6. The method of claim 5, wherein the weight value assigned to dispatch communication capabilities is lower, respectively, than the weight value assigned to telephone interconnect capabilities.

7. The method of claim 5, wherein the weight value assigned to dispatch communication capabilities is lower, respectively, than the weight value assigned to encrypted communication capabilities.

8. The method of claim 5, wherein the weight value assigned to dispatch communication capabilities is lower, respectively, than the weight value assigned to data messaging capabilities.

9. The method of claim 5, wherein the weight value assigned to dispatch communication capabilities is lower, respectively, than the weight value assigned to telephone interconnect, encrypted communication, and data messaging capabilities.

10. In a radio frequency communication system having a resource controller for controlling allocation of a plurality of radio frequency communication resources amongst a plurality of radio frequency communication units, wherein a plurality of the radio frequency communication resources each support more than one communication capability from the group of communication capabilities comprising:
  dispatch communications;
  telephone interconnect;
  encrypted communications;
  data messaging;
a method of assigning a radio frequency communication resource to a radio frequency communication unit, comprising the steps of:
  A) receiving a communication from a radio frequency communication unit, which communication includes an indication of radio frequency communication resource capability needs;
  B) when no radio frequency communication resources are currently available to support the indicated radio frequency communication resource capability needs, declining to provide the radio frequency communication unit with a radio frequency communication resource;
  C) when at least one radio frequency communication resource is currently available to support the indicated radio frequency communication resource capability needs, determining which of the radio frequency communication resources has sufficient capabilities to support the indicated radio frequency communication resource capability needs, to thereby form a group of candidate radio frequency communication resources;
  D) providing each of the candidate radio frequency communication resources with a weight factor related, at least in part, to the particular communication capabilities supported by each of the candidate radio frequency communication resources, by:
    i) assigning each communication capability an associated predetermined weight value, wherein the weight value assigned to dispatch communication capabilities is lower, respectively, than the weight value assigned to telephone interconnect, encrypted communication, and data messaging capabilities; and
    ii) for each candidate radio frequency communication resource, combining the weight values that represent each of the communication capabilities supported by each candidate radio frequency communication resource; and
  E) selecting a particular candidate radio frequency communication resource as a function of the weight factors to thereby minimize usurpation of unused communication capabilities.

* * * * *